US011244505B2

(12) United States Patent
Elg et al.

(10) Patent No.: US 11,244,505 B2
(45) Date of Patent: Feb. 8, 2022

(54) METHODS OF CONSTRUCTING A PRINTABLE 3D MODEL, AND RELATED DEVICES AND COMPUTER PROGRAM PRODUCTS

(71) Applicant: SONY CORPORATION, Tokyo (JP)

(72) Inventors: Johannes Elg, Helsingborg (SE); Henrik Vallgren, Furulund (SE); Fredrik Mattisson, Lund (SE); Fredrik Olofsson, Lund (SE)

(73) Assignee: SONY GROUP CORPORATION, Tokyo (JP)

( * ) Notice: Subject to any disclaimer, the term of this patent is extended or adjusted under 35 U.S.C. 154(b) by 0 days.

(21) Appl. No.: 16/636,749

(22) PCT Filed: Aug. 31, 2017

(86) PCT No.: PCT/US2017/049517
§ 371 (c)(1),
(2) Date: Feb. 5, 2020

(87) PCT Pub. No.: WO2019/045712
PCT Pub. Date: Mar. 7, 2019

(65) Prior Publication Data
US 2020/0202623 A1 Jun. 25, 2020

(51) Int. Cl.
*G06T 17/20* (2006.01)
*B33Y 50/00* (2015.01)
*B29C 64/386* (2017.01)
*G06T 17/10* (2006.01)

(52) U.S. Cl.
CPC .......... *G06T 17/205* (2013.01); *B29C 64/386* (2017.08); *B33Y 50/00* (2014.12); *G06T 17/10* (2013.01)

(58) Field of Classification Search
CPC combination set(s) only.
See application file for complete search history.

(56) References Cited

U.S. PATENT DOCUMENTS

| 6,377,865 | B1 | 4/2002 | Edelsbrunner et al. |
| 6,853,373 | B2 | 2/2005 | Williams et al. |
| 6,996,505 | B1 | 2/2006 | Edelsbrunner et al. |

(Continued)

FOREIGN PATENT DOCUMENTS

GB 2478067 A 8/2011

OTHER PUBLICATIONS

Chari et al. "Robust Prototyping" Solid Freeform Fabrication Proceedings (pp. 135-142) (Aug. 1993).

(Continued)

*Primary Examiner* — Andrew G Yang
(74) *Attorney, Agent, or Firm* — Myers Bigel, P.A.

(57) ABSTRACT

Methods of constructing a printable three-dimensional (3D) model are provided. A method of constructing a printable 3D model includes constructing a ray-cast mesh representation of an object by using ray-casting on a preliminary digital 3D model of the object. Moreover, the method includes converting the preliminary digital 3D model of the object into the printable 3D model, of the object by adding, to the preliminary digital 3D model of the object, an interior surface that is based on the ray-cast mesh representation. Related devices and computer program products are also provided.

19 Claims, 18 Drawing Sheets

(56) References Cited

U.S. PATENT DOCUMENTS

| | | | |
|---|---|---|---|
| 7,023,432 B2 | 4/2006 | Yates et al. | |
| 8,004,517 B1 | 8/2011 | Edelsbrunner et al. | |
| 2004/0197016 A1* | 10/2004 | Littlefield | B33Y 80/00 |
| | | | 382/128 |
| 2008/0012858 A1* | 1/2008 | Matsumoto | G06T 15/50 |
| | | | 345/426 |
| 2012/0141949 A1 | 6/2012 | Bodony et al. | |
| 2013/0120375 A1* | 5/2013 | Jin | G06T 19/00 |
| | | | 345/420 |
| 2013/0176312 A1* | 7/2013 | Schouwenburg | B29C 64/386 |
| | | | 345/424 |
| 2014/0031967 A1 | 1/2014 | Unger et al. | |
| 2015/0055085 A1* | 2/2015 | Fonte | H04N 5/23219 |
| | | | 351/178 |
| 2016/0180512 A1* | 6/2016 | Myers | G06T 11/00 |
| | | | 345/419 |
| 2017/0124726 A1* | 5/2017 | Soulard | G06T 19/20 |
| 2017/0287107 A1* | 10/2017 | Forutanpour | G06T 3/0062 |
| 2018/0033194 A1* | 2/2018 | Goel | G06T 15/06 |
| 2018/0046167 A1* | 2/2018 | Iverson | G06K 9/00201 |

OTHER PUBLICATIONS

Chiu, Wai-kei "Hollowing and reinforcing 3D CAD models and representing multiple material objects for rapid prototyping" Dissertation, The University of Hong Kong (204 pages) (2000).

Notification of Transmittal of the International Search Report and the Written Opinion of the International Searching Authority, or the Declaration, in corresponding PCT Application No. PCT/US2017/049517 (15 pages) (dated Nov. 7, 2017).

Ritsche, Nico "Real-Time Shell Space Rendering of Volumetric Geometry" Proceedings of the 4th international conference on Computer graphics and interactive techniques in Australasia and Southeast Asia (pp. 265-274) (Nov. 2006).

* cited by examiner

METHODS OF CONSTRUCTING A PRINTABLE 3D MODEL, AND RELATED DEVICES AND COMPUTER PROGRAM PRODUCTS

CROSS REFERENCE TO RELATED APPLICATION

This application is a 35 U.S.C. § 371 national stage application of PCT International Application No. PCT/US2017/049517, filed on Aug. 31, 2017, the content of which is incorporated herein by reference in its entirety. The above-referenced PCT International Application was published in the English language as International Publication No. WO 2019/045712 A1 on Mar. 7, 2019.

FIELD

The present disclosure relates to image processing and three-dimensional (3D) printing.

BACKGROUND

The increased availability of technology for printing 3D objects has enabled a wide range of individuals and organizations to print their own models and parts on an on-demand basis. Some 3D objects, however, may be expensive to print (e.g., due to the large volume of material used). Moreover, the process of creating a hollow model of a 3D object that is to be printed may be complex and slow. For example, although a large collection of polygons can be used by computer-aided design software to model a 3D object that is to be printed, some modeling techniques are repeated for every pair of neighboring ones of the polygons. Such repetition can be slow.

SUMMARY

It should be appreciated that this Summary is provided to introduce a selection of concepts in a simplified form, the concepts being further described below in the Detailed Description. This Summary is not intended to identify key features or essential features of this disclosure, nor is it intended to limit the scope of present inventive concepts.

Various embodiments of present inventive concepts include a method of constructing a printable three-dimensional (3D) model. The method may include constructing a ray-cast mesh representation of an object by using ray-casting on a preliminary digital 3D model of the object. Moreover, the method may include converting the preliminary digital 3D model of the object into the printable 3D model of the object by adding, to the preliminary digital 3D model of the object, an interior surface that is based on the ray-cast mesh representation. Advantageously, these operations may quickly refine a preliminary digital 3D model that would otherwise print as a solid physical object into a printable 3D model that can print as a hollow physical object. For example, these operations may not require performing calculations for every pair of neighboring polygons of the preliminary digital 3D model that would print as a solid physical object. These operations may thus simplify and expedite shelling of the preliminary digital 3D model that would otherwise print as a solid physical object, and may reduce 3D printing costs by reducing the amount of material printed, which may also reduce the weight of the product/model that is printed.

According to various embodiments, the preliminary digital 3D model may be a first 3D mesh representation of the object that is printable as a solid physical 3D model. The printable 3D model may be a second 3D mesh representation of the object that is printable as a hollow physical 3D model. Moreover, the converting may include using the ray-cast mesh representation to convert the first 3D mesh representation into the second 3D mesh representation.

In various embodiments, the using ray-casting on the preliminary digital 3D model may include constructing a first portion of the ray-cast mesh representation by using cylindrical coordinates to model a first portion of the object. Moreover, the using ray-casting on the preliminary digital 3D model may include constructing a second portion of the ray-cast mesh representation as by using spherical coordinates to model a second portion of the object.

According to various embodiments, the preliminary digital 3D model may include a plurality of polygons of an exterior surface of the preliminary digital 3D model. The plurality of polygons of the exterior surface may model features of the object. Moreover, the using ray-casting on the preliminary digital 3D model may include locating ones of the plurality of polygons of the exterior surface. In some embodiments, the locating the ones of the plurality of polygons of the exterior surface may include using cylindrical coordinates to locate a first plurality of triangles of a first portion of the exterior surface. Moreover, the locating the ones of the plurality of polygons of the exterior surface may include using spherical coordinates to locate a second plurality of triangles of a second portion of the exterior surface.

In various embodiments, the locating the ones of the plurality of polygons of the exterior surface may include locating a nearest first plurality of triangles that are in a first plane to which an axis that extends through the preliminary digital 3D model is perpendicular. Moreover, the locating the ones of the plurality of polygons of the exterior surface may include locating a nearest second plurality of triangles that are in a second plane to which the axis is perpendicular.

According to various embodiments, the locating the ones of the plurality of polygons of the exterior surface may include performing a discrete number of searches for a plurality of triangles in a first portion of the exterior surface. Moreover, the locating the ones of the plurality of polygons of the exterior surface may include performing the discrete number of searches for the plurality of triangles in a second portion of the exterior surface. In some embodiments, the performing the discrete number of searches for the plurality of triangles in the first portion of the exterior surface may include searching in a discrete number of directions to construct a first portion of the ray-cast mesh representation by using cylindrical coordinates. Moreover, the performing the discrete number of searches for the plurality of triangles in the second portion of the exterior surface may include searching in the discrete number of directions to construct a second portion of the ray-cast mesh representation by using spherical coordinates.

In various embodiments, the converting may include shaping the interior surface to construct the printable 3D model as a hollow digital shell including an opening that exposes the interior surface. Additionally or alternatively, the converting may include: forming a first portion of the interior surface based on a cylinder; and forming a second portion of the interior surface based on a sphere or hemisphere. In some embodiments, the method may include providing the printable 3D model to a 3D printer. Additionally or alternatively, the method may include: receiving, in a storage medium, image data for the object from an image capture device; and constructing the preliminary digital 3D model based on the image data.

According to various embodiments, the converting may include forming the interior surface at a predetermined distance from an exterior surface of the preliminary digital 3D model. Moreover, an exterior surface of the preliminary digital 3D model may include a higher level of topological detail of a surface of the object than the interior surface.

In various embodiments, an electronic device may include a processor. Moreover, the electronic device may include a storage medium coupled to the processor and including computer readable program code therein that when executed by the processor causes the processor to perform any of the method operations. Additionally or alternatively, a computer program product may include a non-transitory computer readable storage medium that includes computer readable program code therein that when executed by a processor causes the processor to perform any of the method operations.

A computer program product, according to various embodiments, may include a non-transitory computer readable storage medium that includes computer readable program code therein that when executed by a processor causes the processor to perform operations including constructing a ray-cast mesh representation of an object by using ray-casting on a preliminary digital 3D model of the object. The operations may include converting the preliminary digital 3D model of the object into a printable 3D model of the object by adding, to the preliminary digital 3D model of the object, an interior surface that is based on the ray-cast mesh representation. Moreover, the operations may include providing the printable 3D model to a 3D printer.

According to various embodiments, the preliminary digital 3D model may include a plurality of triangles of an exterior surface of the preliminary digital 3D model that model features of the object. Moreover, the computer readable program code may include computer readable program code configured to perform the ray-casting on the preliminary digital 3D model by: using cylindrical coordinates to locate first ones of the plurality of triangles of a first portion of the exterior surface; and using spherical coordinates to locate second ones of the plurality of triangles of a second portion of the exterior surface.

An electronic device, according to various embodiments, may include a processor. Moreover, the electronic device may include a storage medium coupled to the processor and including computer readable program code that when executed by the processor causes the processor to perform operations including constructing a ray-cast mesh representation of an object by using ray-casting on a preliminary digital 3D model of the object. The operations may further include converting the preliminary digital 3D model of the object into a printable 3D model of the object by adding, to the preliminary digital 3D model of the object, an interior surface that is based on the ray-cast mesh representation.

According to various embodiments, the processor may be configured to perform the converting by shaping the interior surface to construct the printable 3D model as a hollow digital shell including an opening that exposes the interior surface. Moreover, the processor may be further configured to provide the hollow digital shell to a 3D printer.

In various embodiments, the electronic device may be a portable electronic device including the storage medium, the processor, and an image capture device that is configured to capture image data of the object. The preliminary digital 3D model may include a plurality of triangles of an exterior surface of the preliminary digital 3D model that model features of the object based on the image data. Moreover, the processor may be configured to perform the ray-casting on the preliminary digital 3D model by: using cylindrical coordinates to locate first ones of the plurality of triangles of a first portion of the exterior surface; and using spherical coordinates to locate second ones of the plurality of triangles of a second portion of the exterior surface.

BRIEF DESCRIPTION OF THE DRAWINGS

The accompanying drawings, which form a part of the specification, illustrate various embodiments of present inventive concepts. The drawings and description together serve to fully explain embodiments of present inventive concepts.

DETAILED DESCRIPTION

Figure 1A:
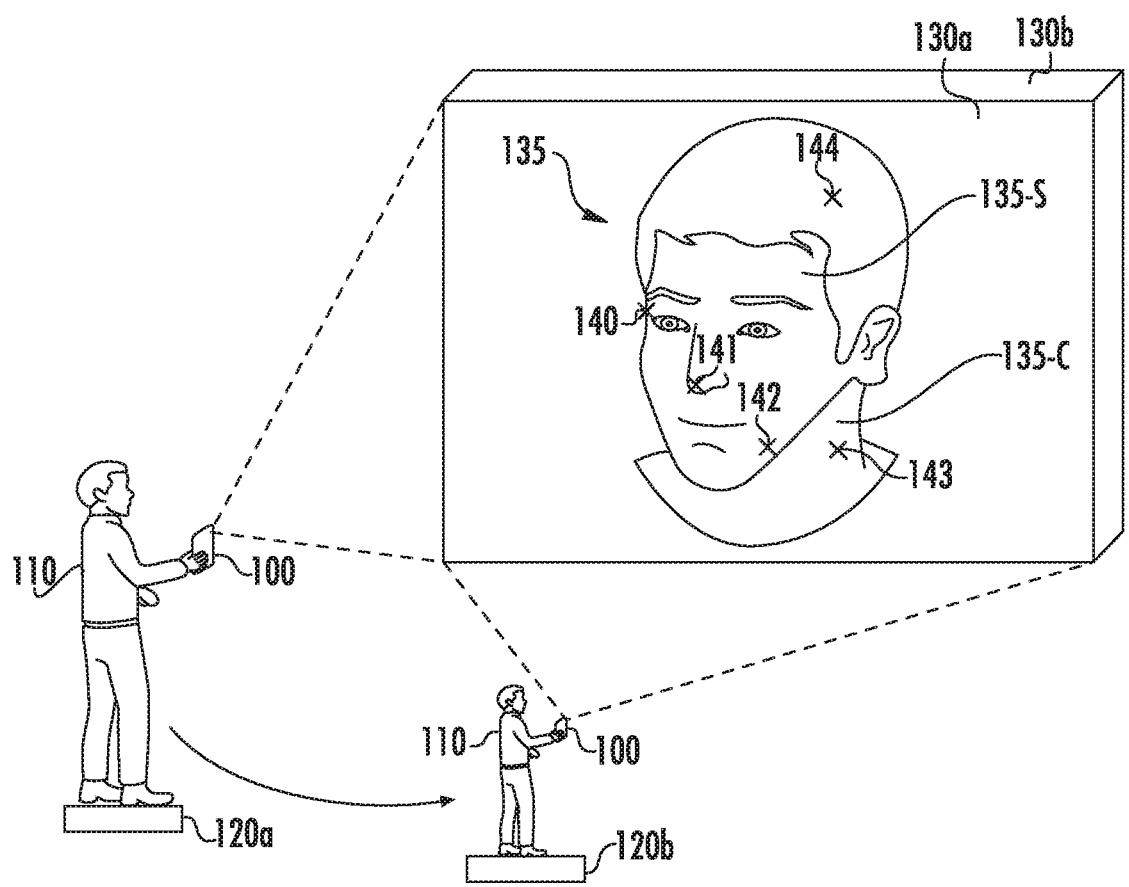
FIG. 1A is a diagram that illustrates a user capturing multiple images of an object with an electronic device, according to various embodiments of present inventive concepts.

Although 3D printing technology has enabled printing of 3D models of many different types of objects, printing a solid 3D object may be expensive due to the amount of printing material involved. In particular, due to the cost of materials for 3D printing, it may be undesirable to print a solid 3D object. A solid 3D object would also be heavier than a hollow 3D object. Moreover, although computer-aided design software may be used to generate a digital 3D model that is printable as a hollow physical 3D object, conventional techniques for generating the digital 3D model that is printable as a hollow physical 3D object may be complex and slow.

Various embodiments of present inventive concepts, however, may provide fast shelling of a preliminary digital 3D model (e.g., a digital polygonal mesh representation of a physical object) that would otherwise print as a solid physical 3D model/object, to quickly generate a printable 3D model that can print as a hollow physical 3D model/object. By printing such a 3D shell rather than a solid 3D object, significantly smaller amounts of printing material may be used, thus reducing model/object weight and printing costs. The term "shelling," as used herein, refers to converting (a) a first digital 3D model that would otherwise be printable as a solid physical 3D model/object into (b) a second digital 3D model that is printable as a hollow physical 3D model/object. The term "refining," as used herein, may refer to such "shelling"/"converting." Moreover, some embodiments herein provide fast shelling of a preliminary digital 3D model of a person's head by recognizing that the same general shapes may apply to 3D models of different people's heads.

For example, when performing shelling of a preliminary digital 3D model of a person's head, various embodiments herein may model an interior surface of the person's head as a combination of a cylinder and a half-sphere. In particular, ray-casting may be performed on the preliminary digital 3D model to provide fast shelling. As one example, ray-casting may start at a portion of the neck, which resembles a cylinder, of the preliminary digital 3D model, and may then move upward around the head, the top half of which resembles a half-sphere. Ray-casting may quickly locate closest points (in planes to which an axis through the preliminary digital 3D model is perpendicular) on an exterior surface of the preliminary digital 3D model. Using ray-casting for shelling may thus be significantly faster than conventional computer-aided design techniques, which may involve attempting to compute surfaces exactly by methodically performing calculations for every pair of neighboring triangles of a mesh representation of an object.

Accordingly, some embodiments herein may provide simplified operations for generating a printable 3D model of a person's head. These simplified operations may be faster because they are less complex and use less code. Specifically, the number of operations/calculations may be reduced in comparison with conventional techniques of performing calculations for every pair of neighboring triangles. Unlike such conventional techniques, the operations herein may refrain from performing calculations for every pair of neighboring triangles. Moreover, although the operations herein may be optimized/customized for head scans/images, they may alternatively be used for parts of a person other than the head, or for objects other than people.

FIG. 1A is a diagram that illustrates a user 110 capturing multiple images 130 of an object 135 with an electronic device 100, according to various embodiments of present inventive concepts. Although FIG. 1A illustrates an example in which the images 130 are captured by an image capture device 340 (FIG. 3A) at the electronic device 100, the images 130 may alternatively be captured by another device and subsequently received by the electronic device 100.

In FIG. 1A, the user 110 initiates a photographic session of the object 135, such as a person's face or an automobile, at location 120a. The user 110 may physically move around the object 135 to various locations, such as from the location 120a to a different location 120b. An image 130 of the object 135 is captured at each location. For example, image 130a is captured when the electronic device 100 is at the location 120a, and image 130b is captured when the electronic device 100 moves to the different location 120b. The captured images 130 may each be two-dimensional (2D) images.

The electronic device 100 may provide images 130 at various angles as the user 110 walks around the object 135. For example, the user 110 may capture images 130 around 360 degrees (or, alternatively, at least 180 degrees) of the object 135. After capturing at least two images 130, such as the images 130a and 130b, the images 130 may be processed by a processor 350 (FIG. 3A) in the electronic device 100, or by a processor external to the electronic device 100, to construct a preliminary digital 3D model 150 (FIG. 1B) of the object 135, or to otherwise generate a 3D image. The terms "construct" (or "constructing"), "generate" (or "generating"), and "build" (or "building") may be used interchangeably herein.

In some embodiments, the preliminary digital 3D model 150 of the object 135 may model two different portions of the object 135. For example, the preliminary digital 3D model 150 may model both an upper portion 135-S that is generally spherically (or hemi-spherically) shaped and a lower portion 135-C that is generally cylindrically shaped. As an example, a top portion of a human head may generally be hemi-spherically shaped, whereas neck and shoulder areas may be more accurately modeled by a cylinder. As used herein, the terms "hemi-spherically," "hemi-spherical," and "hemisphere" may refer to a half-sphere or to any other partial sphere, including shapes the resemble more than half of a sphere or less than half of a sphere.

Processing of the images 130 may include identifying points 140-144 of the object 135 as captured in the images 130. The points 140-144 may include various edges, corners, or other points on a surface of the object 135. The points 140-144 may be recognizable locations on the physical object 135 that are tracked in various images 130 of the physical object 135. In some embodiments, constructing a preliminary digital 3D model 150 of the object 135 may involve capturing several (e.g., three, four, five, or more) images 130 of the object 135 and identifying tens, hundreds, or thousands of points 140-144. Locations (e.g., coordinates) of the points 140-144 may be estimated using various modeling/statistical techniques.

Figure 1B:
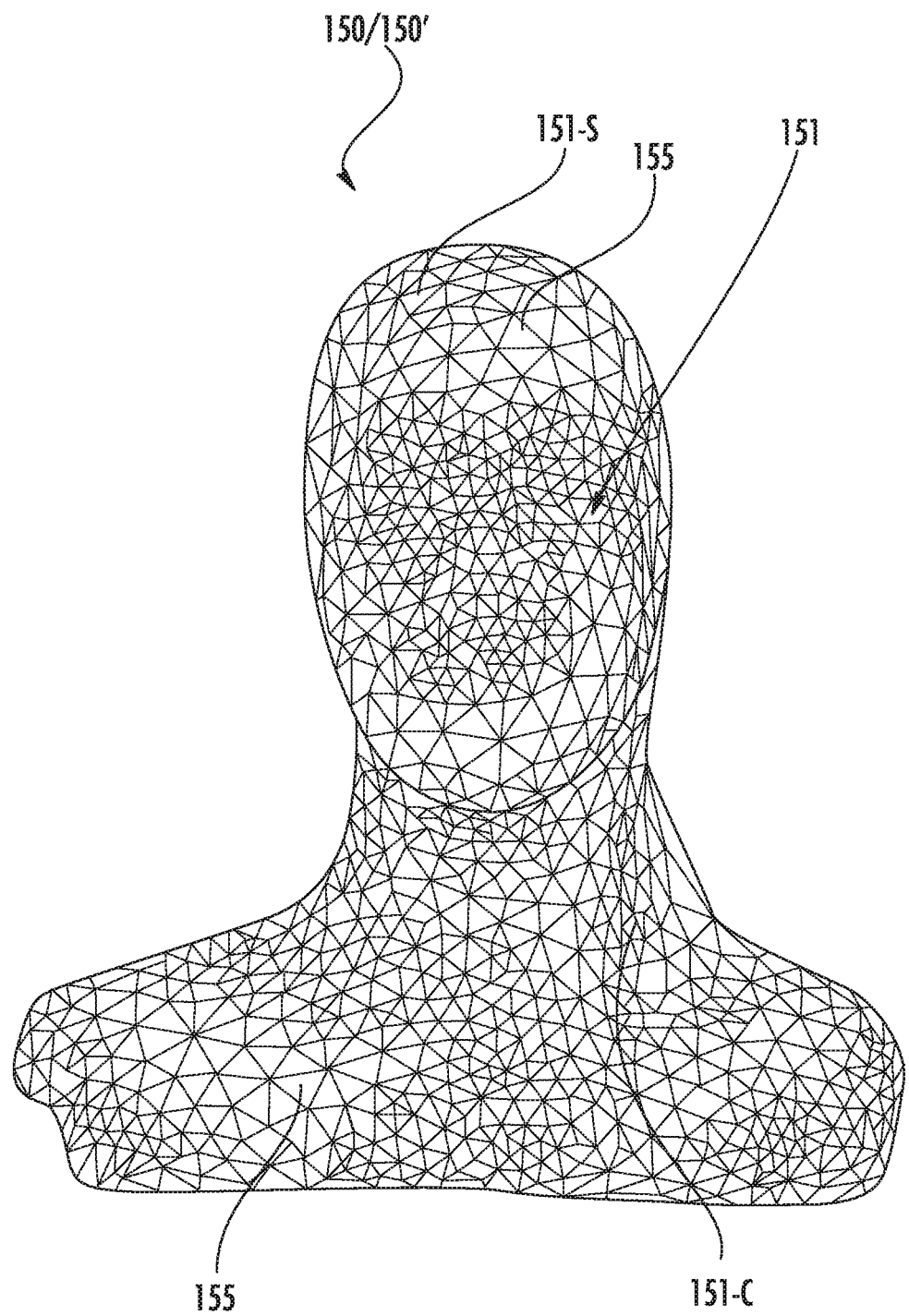
FIGS. 1B-1D are diagrams that illustrate 3D models of an object, according to various embodiments. Moreover.
Figure 1C:
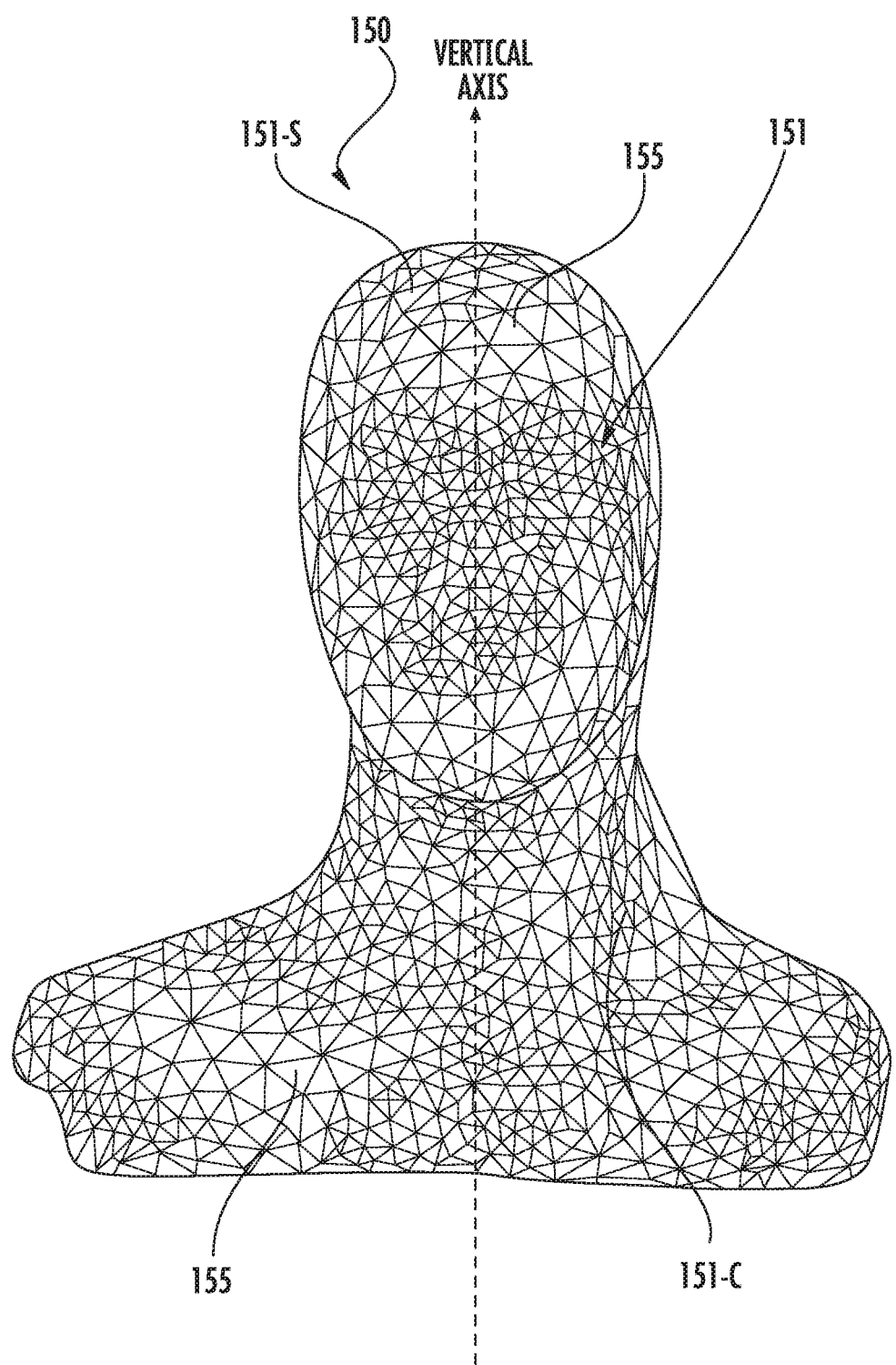
Figure 1D:
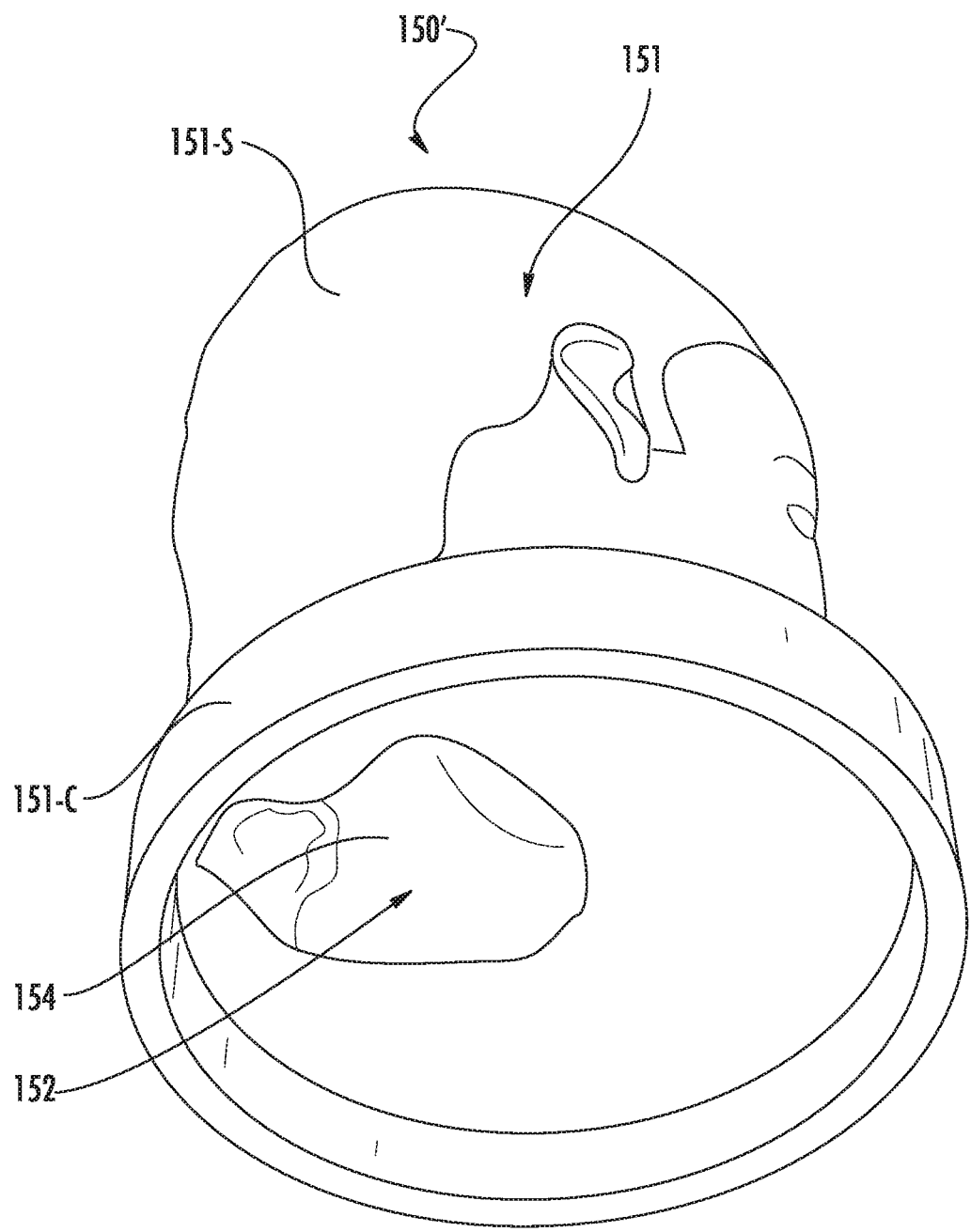

FIGS. 1B-1D are diagrams that illustrate 3D models 150/150' of an object 135, according to various embodiments. Referring to FIG. 1B, a preliminary digital 3D model 150 of the object 135 includes an exterior surface 151 that includes a plurality of polygons 155. The plurality of polygons 155 provide a representation of an exterior surface of the object 135. For example, the plurality of polygons 155 may model features, such as features at the points 140-144, on the exterior surface of the object 135. In some embodiments, the plurality of polygons 155 may include a plurality of triangles. Additionally or alternatively, texture (e.g., hair or skin, when the object 135 is a person) may be mapped to the plurality of polygons 155.

The exterior surface 151 of the preliminary digital 3D model 150 may include two portions that model two differently-shaped portions, respectively, of the object 135. As an example, the exterior surface 151 of the preliminary digital 3D model 150 may include an upper portion 151-S that models the upper portion 135-S of the object 135 that is generally spherically (or hemi-spherically) shaped, and may further include a lower portion 151-C that models the lower portion 135-C of the object 135 that is generally shaped like a cylinder.

A printable 3D model 150' (e.g., a refined/second printable model) may be constructed by modifying/refining the preliminary digital 3D model 150 (e.g., a preliminary/first printable model). The preliminary digital 3D model 150 and the printable 3D model 150' are both digital models and may be referred to as "computer," "virtual," "mesh," or "electronic" models of the physical object 135. In some embodiments, the upper portion 151-S may be more spherically (or hemi-spherically) shaped in the printable 3D model 150' than in the preliminary digital 3D model 150. Additionally or alternatively, the lower portion 151-C may be more cylindrically shaped in the printable 3D model 150' than in the preliminary digital 3D model 150. Moreover, a level of topological detail of the exterior surface 151 may be lower in the printable 3D model 150' than in the preliminary digital 3D model 150. Alternatively, the printable 3D model 150' and the preliminary digital 3D model 150 may represent similar (or even equal) levels of topological detail of the object 135, and/or may have a similarly (or even identically) shaped exterior surface 151. For example, the same exterior surface 151 may be used for both the printable 3D model 150' and the preliminary digital 3D model 150, and modifying the preliminary digital 3D model 150 may include forming an interior surface 154 (FIG. 1D) and, in some embodiments, forming an opening 152 (FIG. 1D).

Referring to FIG. 1C, ray-casting may be performed with respect to a vertical axis that extends through the preliminary digital 3D model 150. For example, the ray-casting may be performed by casting a ray from the vertical axis outward to the exterior surface 151 of the preliminary digital 3D model 150. In some embodiments, the vertical axis (which may also be referred to as a "pole") may extend through a center of the preliminary digital 3D model 150. As an example, when the object 135 is a person, the vertical axis may extend through a center of the person's head and may be aligned with the person's nose. Moreover, in some embodiments, the ray-casting may be performed by using a sphere (or half-sphere) above the person's nose and a cylinder below the nose. Accordingly, the ray-casting may assume that portions above the nose are spherical (or hemispherical) and that portions below the nose are cylindrical. This may simplify and expedite the ray-casting process. Moreover, it will be understood that it is not required to use any information with respect to parts of the person's face. Rather, operations herein may include simply selecting half of the head height without knowing where the nose is. This will likely result in a selection in the immediate proximity of the nose, even though the location of the nose does not have to be known.

A ray-cast mesh representation of the object 135 may be constructed by performing the ray-casting with respect to the vertical axis, and the preliminary digital 3D model 150 may be modified based on the ray-cast mesh representation. For example, the preliminary digital 3D model 150 may be a first 3D mesh representation that is printable as a solid physical 3D model, and the ray-cast mesh representation may be used to convert the first 3D mesh representation into a second 3D mesh representation that is printable as a hollow physical 3D model 170 (FIG. 1E) by forming the interior surface 154 (FIG. 1D). The ray-casting may be performed from the vertical axis inside the preliminary digital 3D model 150, out to the exterior surface 151, to generate a surface model.

Referring to FIG. 1D, the printable 3D model 150' includes the interior surface 154 that is formed based on the ray-cast mesh representation. To simplify the ray-casting process and subsequent printing of the printable 3D model 150', the interior surface 154 may, in some embodiments, be formed to have a lower level of topological detail of a surface of the object 135 than the exterior surface 151. Alternatively, the interior surface 154 and the exterior surface 151 may have similar (or even equal) levels of topological detail. Moreover, irrespective of the level of topological detail, the polygons (e.g., triangles) 155 that form the interior surface 154 may be connected to the polygons (e.g., triangles) 155 that form the exterior surface 151. Accordingly, all of the polygons 155 may be connected in the same unitary polygonal mesh representation of the object 135.

Figure 1E:
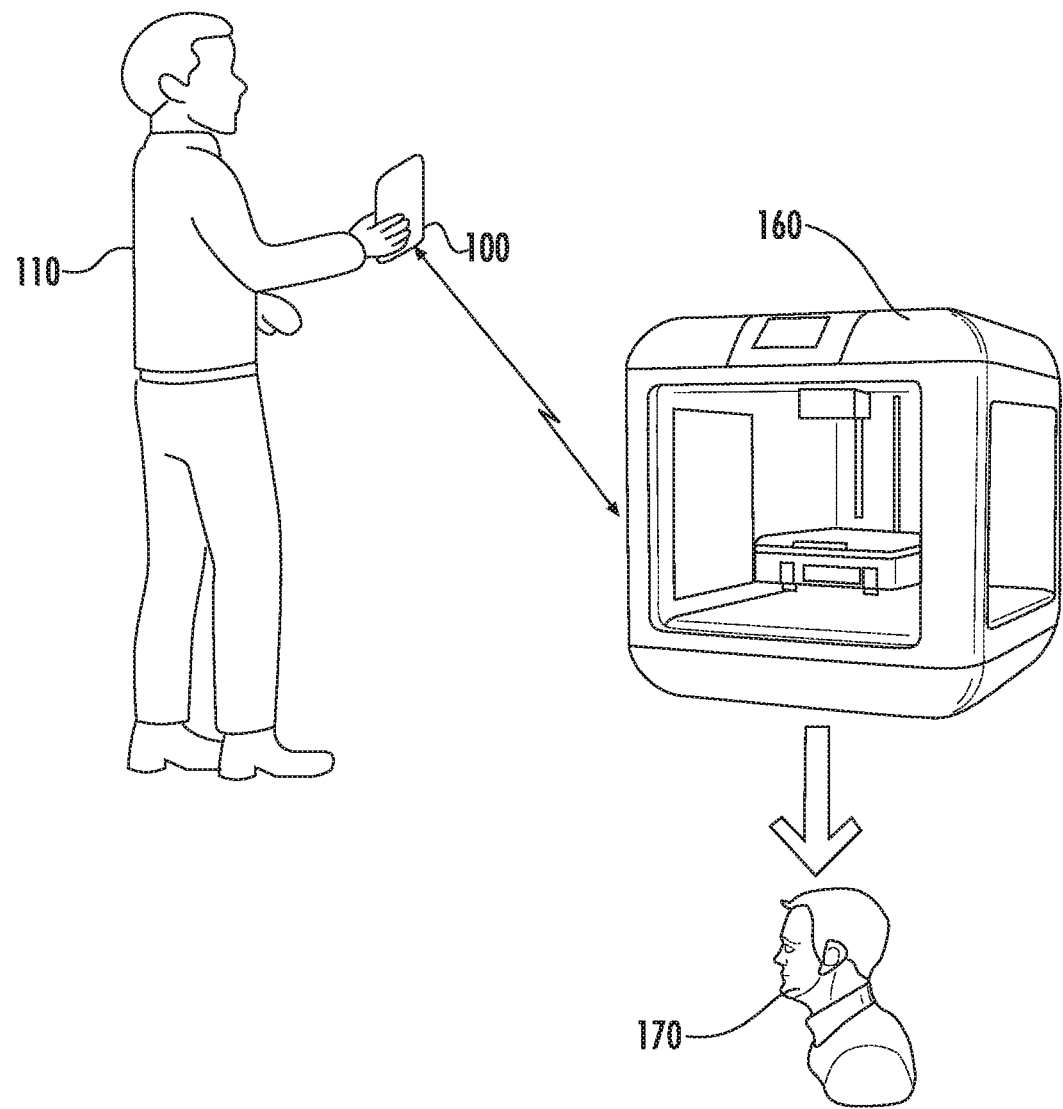
FIG. 1E is a diagram that illustrates a user of an electronic device providing a 3D model of an object to a 3D printer that prints a model of the object, according to various embodiments.
Figure 1F:
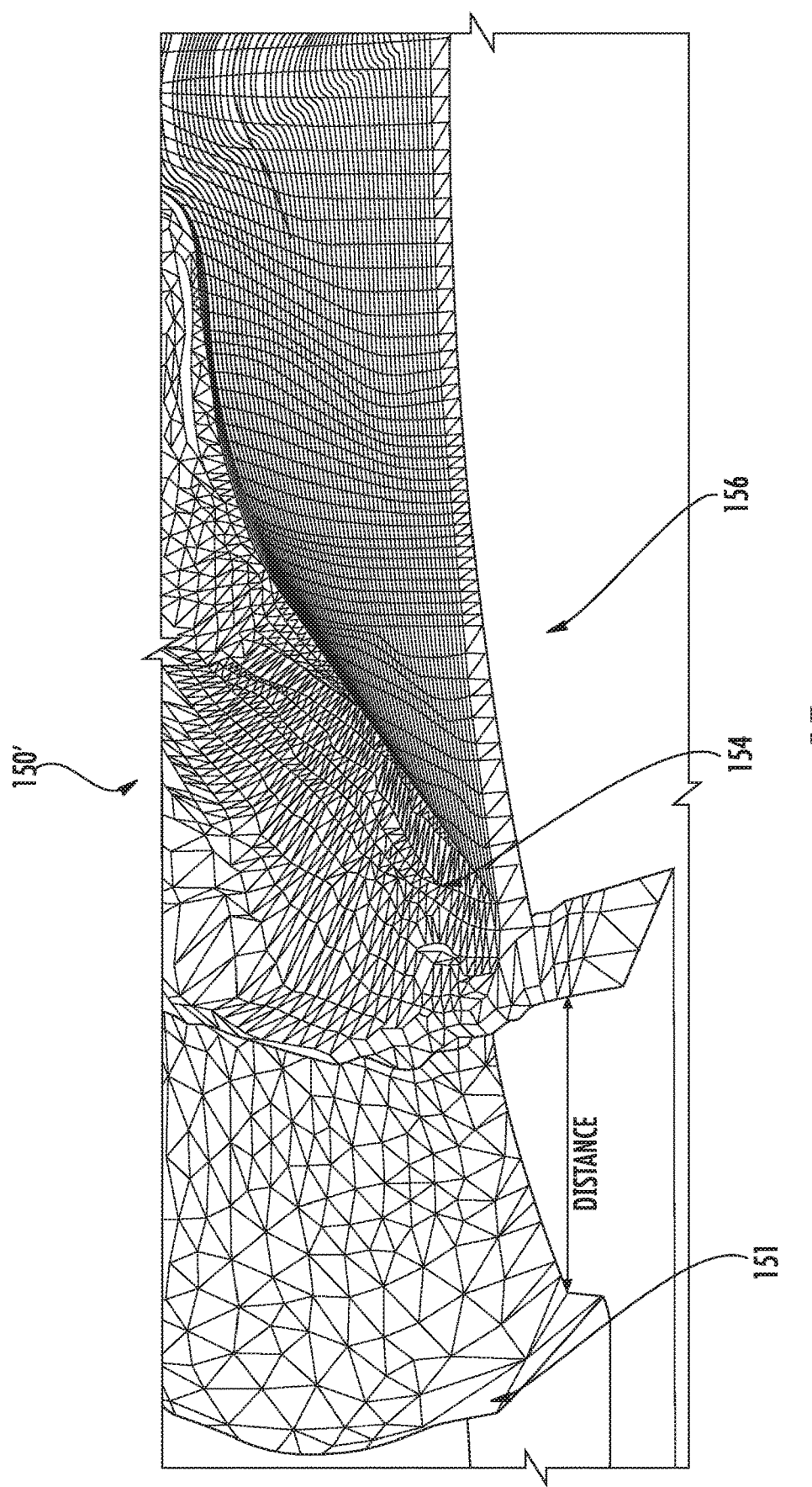
FIG. 1F illustrates an interior view of a printable 3D model of FIG. 1B or FIG. 1D.

The printable 3D model 150' may, in some embodiments, include an opening 152 in the exterior surface 151. The opening 152 may expose the interior surface 154. The interior surface 154 (of the mesh representation before printing, and/or of the model 170 (FIG. 1E) after printing) may thus be visible through the opening 152 to a user 110 who uses an electronic device 100 and/or a 3D printer 160 (FIG. 1E). For example, when the object 135 is a person, features such as a nose and ears of the person may be visible on the interior surface 154 through the opening 152. The opening 152 may be advantageous because it enables removal of excess material that is used when printing the printable 3D model 150' as the model 170 (FIG. 1E). As an example, the opening 152 may enable any remaining powder (or other material) inside the shell to be poured/rinsed out after printing the model 170 (FIG. 1E). Moreover, FIG. 1D illustrates that the shoulders of a person may be modeled as a cylinder in the lower portion 151-C of the printable 3D model 150'. Furthermore, FIG. 1F illustrates an interior view of the printable 3D model 150' of FIG. 1B or FIG. 1D. In particular, FIG. 1F illustrates that the shapes/contours of the interior surface 154 may substantially conform to the shapes/contours of the exterior surface 151. Although FIG. 1F illustrates a distance between the interior and exterior surfaces 151, 154, it will be understood that this distance may be a thickness of connected polygons (e.g., triangles) rather than an empty space. This is the thickness that will be printed as the model 170. FIG. 1F also illustrates a cavity 156 inside the printable 3D model 150'. The interior surface 154 faces/surrounds the cavity 156, which may be connected to/combined with the opening 152.

FIG. 1E is a diagram that illustrates a user 110 of an electronic device 100 providing 3D model of an object to a 3D printer 160 that prints a model 170 of the object, according to various embodiments. For example, the user 110 may provide a printable 3D model 150' of the object 135 of FIG. 1A to the 3D printer 160, which may then print the model 170 of the object 135. The 3D printer 160 may be one of various types of commercially available 3D printers, and may use powder, a resin, plastic, and/or other materials to print the model 170. The printable 3D model 150' may be provided to the 3D printer 160 as any digital file type that the 3D printer 160 can read. In some embodiments, the 3D printer 160 may print the model 170 from a digital file via additive manufacturing, in which the 3D printer 160 successively adds material layer by layer.

FIGS. 2A to 2J are flowcharts of operations for constructing a printable 3D model 150', according to various embodiments. Although an electronic device 100 may be configured to perform any of the operations in the flowcharts of FIGS. 2A to 2J, one or more of the operations may, in some embodiments, be performed outside of the electronic device 100.

Figure 2A:
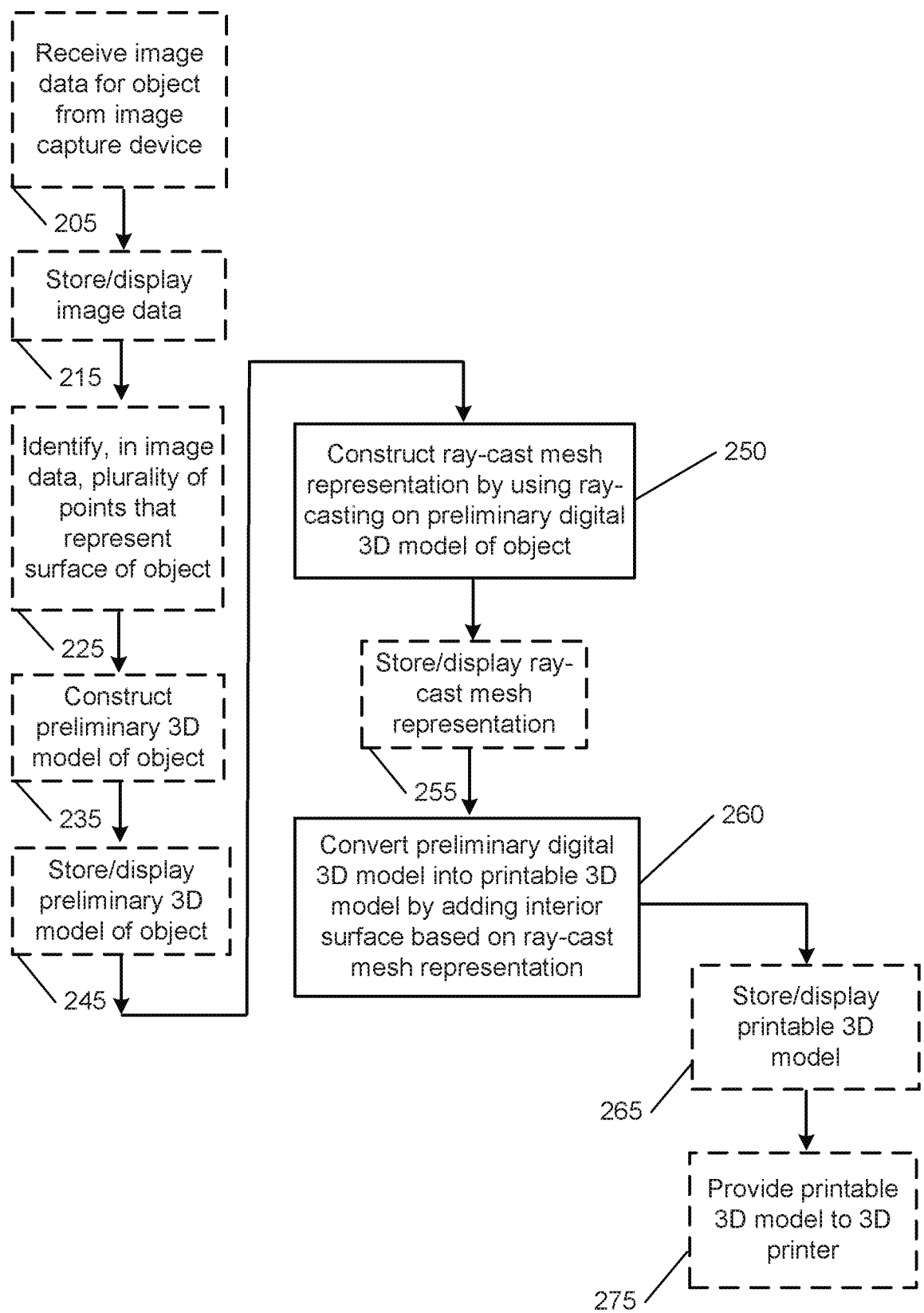
FIGS. 2A to 2J are flowcharts of operations for constructing a printable 3D model, according to various embodiments.
Figure 2B:
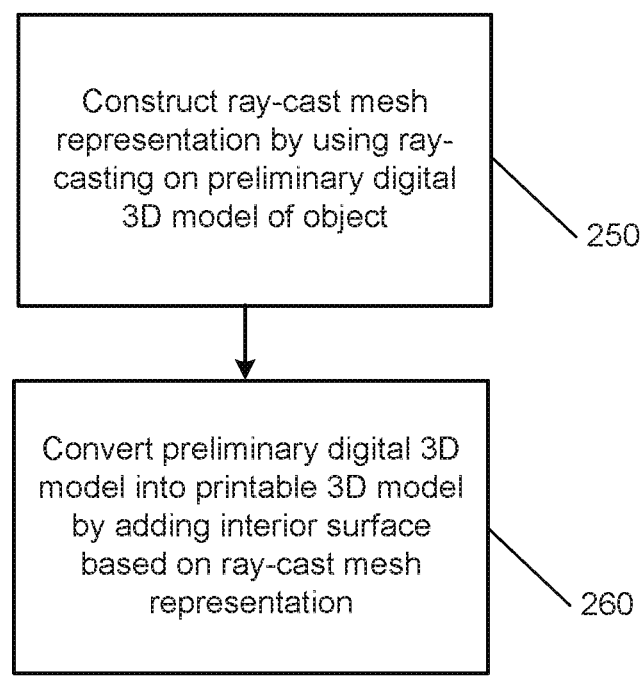

Referring to FIGS. 2A and 2B, operations for constructing the printable 3D model 150' include constructing (Block 250) a ray-cast mesh representation of an object 135 by using ray-casting on a preliminary digital 3D model 150 of the object 135. Moreover, the operations include converting (Block 260) the preliminary digital 3D model 150 into the printable 3D model 150' by adding, to the preliminary digital 3D model 150, an interior surface 154 that is based on the ray-cast mesh representation. Accordingly, the exterior surface 151 may be the same for both the preliminary digital 3D model 150 and the printable 3D model 150', and the interior surface 154 of the printable 3D model 150' may be based on a ray-cast mesh representation of the exterior surface 151 of the preliminary digital 3D model 150. The interior surface 154 may face/surround a cavity 156 (e.g., a cavity centered around the vertical axis in FIG. 1C) in the printable 3D model 150', thus making it hollow. In some embodiments, the preliminary digital 3D model 150 is converted into the printable 3D model 150' by adding the cavity 156 and the interior surface 154 to the preliminary digital 3D model 150. Moreover, Block 260 may, in some embodiments, be described as "constructing" the printable 3D model 150' by "forming" the interior surface 154 of the printable 3D model 150' based on the ray-cast mesh representation.

The operations of Blocks 250 and 260 may be performed by an electronic device 100, which may be a smartphone, a tablet computer, a laptop computer, a portable camera, or one of various other portable electronic devices. Alternatively, the operations of Blocks 250 and 260 may be performed by a server, a desktop computer, a fixed camera (e.g., a security camera), or another electronic device that is separate from, and less portable than, the electronic device 100. The electronic device 100 may, in some embodiments, be referred to as a "mobile device" or a "user equipment."

Referring still to FIG. 2A, operations for constructing the printable 3D model 150' may include various optional operations. For example, after convening (Block 260) the preliminary digital 3D model 150 into the printable 3D model 150', the operations may, in some embodiments, include storing/displaying (Block 265) the printable 3D model 150'. As an example, the printable 3D model 150' may be stored in a storage medium 370 (FIG. 3A) of an electronic device 100. Additionally or alternatively, the printable 3D model 150' may be displayed on a display of a Graphical User Interface (GUI) 390 (FIG. 3A) of the electronic device 100. In some embodiments, a user 110 may rotate, or otherwise manipulate, the printable 3D model 150' that is displayed on the electronic device 100.

Figure 3A:
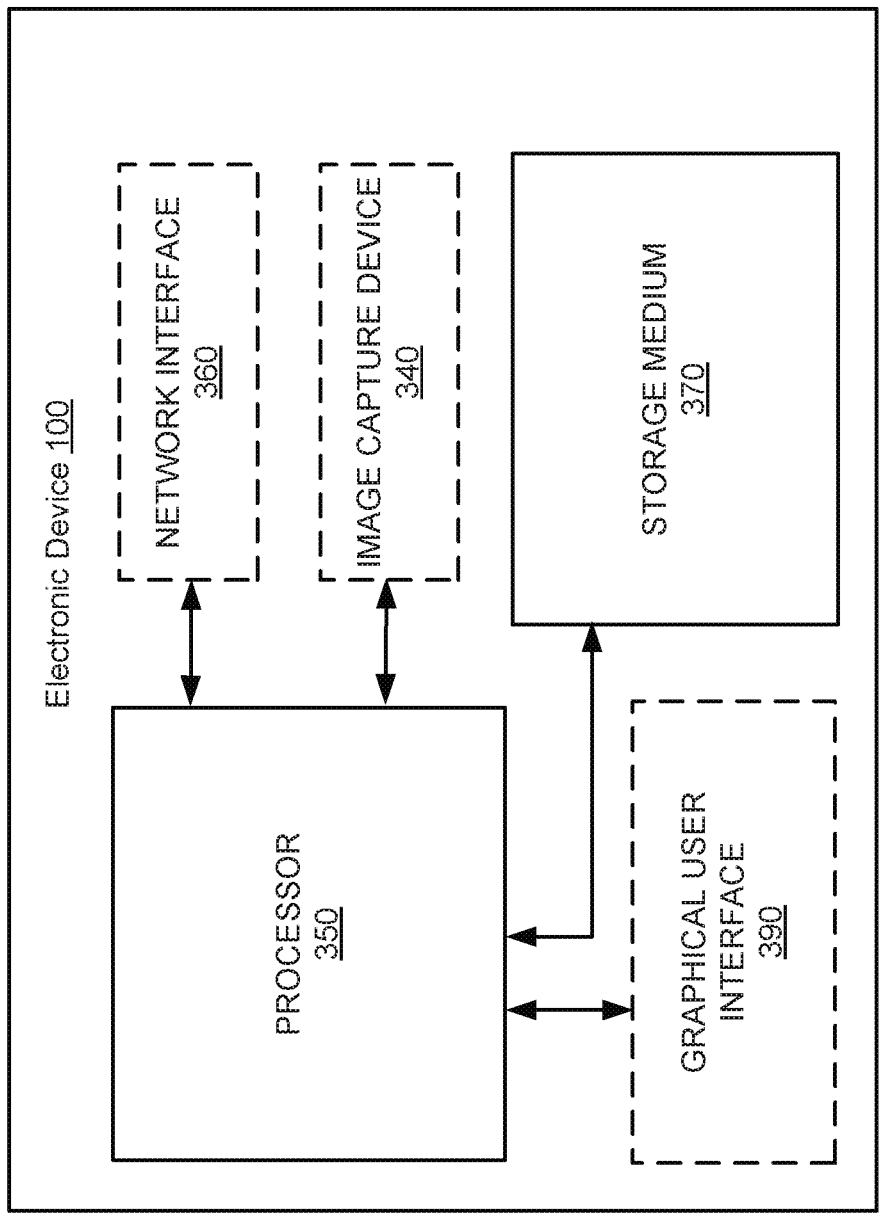
FIG. 3A is a block diagram of an electronic device of FIG. 1A or FIG. 1E, according to various embodiments.

Moreover, operations may, in some embodiments, include providing (Block 275) the printable 3D model 150' to a 3D printer 160. The printable 3D model 150' may be provided to the 3D printer 160 as any digital file that is readable by the 3D printer 160. An electronic device 100 may provide the printable 3D model 150' to the 3D printer 160 via a network interface 360 (FIG. 3A) of the electronic device 100. The network interface 360 may communicate with the 3D printer 160 over a wireless connection or a wired connection. In some embodiments, the printable 3D model 150' may be provided to the 3D printer 160 in response to an input from a user 110 via a GUI 390 (FIG. 3A).

After constructing (Block 250) the ray-cast mesh representation of the object 135, the ray-cast mesh representation may be stored/displayed (Block 255). For example, the ray-cast mesh representation may be stored in a storage medium 370 (FIG. 3A) of an electronic device 100 and/or displayed on a display of a GUI 390 (FIG. 3A) of the electronic device 100. As an example, a user 110 of the electronic device 100 may desire to view the ray-cast mesh representation before constructing the printable 3D model 150' that is based on the ray-cast mesh representation (e.g., before converting (Block 260) the preliminary digital 3D model 150 into the printable 3D model 150').

Various operations may, in some embodiments, be performed before constructing (Block 250) the ray-cast mesh representation of the object 135. The operations may include receiving (Block 205), in a storage medium 370 (FIG. 3A), image data for an object 135 from an image capture device 340 (FIG. 3A). In some embodiments, the same electronic device 100 that captures the image data may construct (Block 235) a preliminary digital 3D model 150 of the object 135 based on the image data. Alternatively, one device may capture the image data and a different device may construct the preliminary digital 3D model 150 based on the image data. Moreover, operations of receiving (Block 205) the image data may refer to storing image data in the same electronic device 100 that captured the image data, or to receiving the image data from another device via a network interface 360 (FIG. 3A). In some embodiments, the image data may refer to photos or to frames from a video stream. The preliminary digital 3D model 150 may be constructed using numerous techniques, however, and the ray-casting operations in Blocks 250 and 260 can be used regardless of how the preliminary digital 3D model 150 was created or what input data/images were used.

In addition to, or as an alternative to, operations of Block 205, operations may, in some embodiments, include storing/displaying (Block 215) image data. For example, the image data may be stored in a storage medium 370 (FIG. 3A) of an electronic device 100 and/or displayed on a display of a GUI 390 (FIG. 3A) of the electronic device 100. As an example, a user 110 of the electronic device 100 may desire to view 2D images 130 before constructing (Block 235) a preliminary digital 3D model 150 that is based on the 2D images 130.

In some embodiments, operations may include identifying (Block 225), in image data, a plurality of points 140-144 that represent a surface of an object 135. Constructing (Block 235) a preliminary digital 3D model 150 may be performed using the plurality of points 140-144 that are identified. Moreover, operations may include storing/displaying (Block 245) the preliminary digital 3D model 150. For example, the preliminary digital 3D model 150 may be stored in a storage medium 370 (FIG. 3A) of an electronic device 100 and/or displayed on a display of a GUI 390 (FIG. 3A) of the electronic device 100. As an example, a user 110 of the electronic device 100 may desire to view the preliminary digital 3D model 150 before constructing (Block 250) the ray-cast mesh representation that is based on the preliminary digital 3D model 150.

Figure 2C:
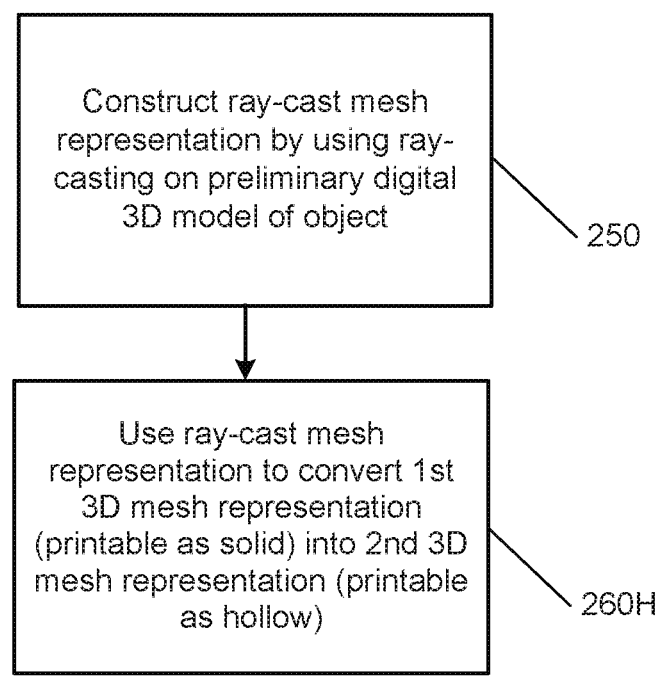

Referring now to FIG. 2C, a preliminary digital 3D model 150 may be a first 3D mesh representation of a physical object 135 that is printable as a solid physical 3D model. Accordingly, if the first 3D mesh representation is provided to a 3D printer 160, then a physical model of the object 135 will be printed as a solid, rather than hollow, model, and thus may undesirably increase printing costs and the weight of the model. In various embodiments of present inventive concepts, however, a hollow physical 3D model 170 may be printed when the printable 3D model 150' is a second 3D mesh representation of the object 135 that is printable as the hollow physical 3D model 170. By contrast, printing the first 3D mesh representation could be ten (10), twenty (20), or even fifty (50) times more expensive than printing the second 3D mesh representation. It therefore may be advantageous to create/shape an interior surface 154 to provide a second/refined 3D mesh representation. As such, FIG. 2C illustrates that the "converting" operations in Block 260 may include using (Block 260H) the ray-cast mesh representation to convert the first 3D mesh representation into the second 3D mesh representation, which may significantly reduce printing costs and model 170 weight.

For example, converting (Block 260) the preliminary digital 3D model 150 into the printable 3D model 150' may include forming the interior surface 154 at a predetermined distance from an exterior surface 151 of the preliminary digital 3D model 150, thus generating the printable 3D model 150' to be printable as a hollow shell model 170 with a predetermined thickness. Aside from this thickness, the shell model 170 may be empty/devoid of the material that forms the shell model 170. Specifically, after constructing (Block 250) the ray-cast mesh representation, the converting (Block 260) may include retreating/subtracting the ray-cast mesh representation by the thickness (e.g., a predetermined distance), to form the interior surface 154 at the thickness/distance from the exterior surface 151. This is the thickness that will be printed as the model 170. Interior portions of the printable 3D model 150' that are more distant from the exterior surface 151 than this thickness/distance may be empty/void when the model 170 is printed.

Additionally or alternatively, to simplify the ray-casting process and subsequent printing of the printable 3D model 150', the interior surface 154 of the printable 3D model 150' may be formed such that an exterior surface 151 of the preliminary digital 3D model 150 has a higher level of topological detail of a surface of the object 135 than the interior surface 154. As an example, in some embodiments, the level of topological detail of the interior surface 154 may not be important, and thus may be relatively low.

Figure 2D:
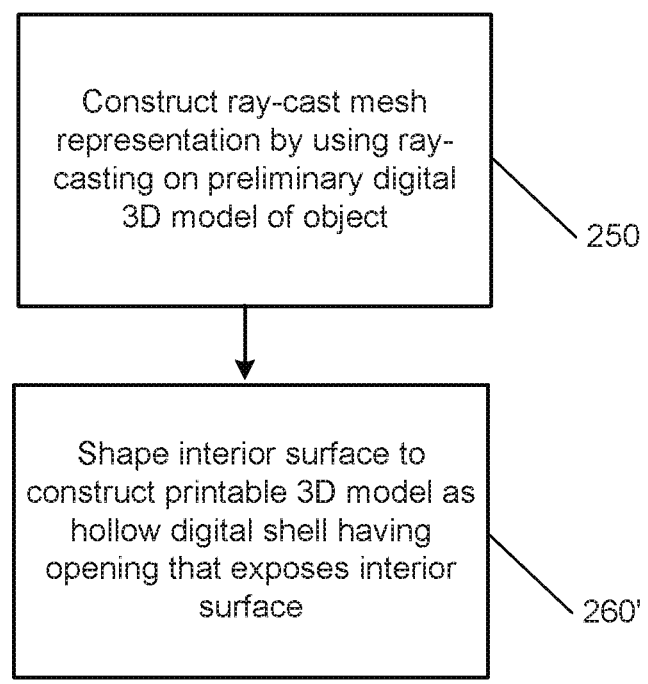

Referring now to FIG. 2D, the "converting" operations in Block 260 may, in some embodiments, include forming an opening 152 that exposes the interior surface 154. In particular, forming/adding the interior surface 154 may include shaping (Block 260') the interior surface 154 to construct the printable 3D model 150' as a hollow digital shell that includes the opening 152. In some embodiments, the opening 152 may be at a bottom portion of the model 170, which may simplify pouring/rinsing out any loose excess material that remains inside the hollow physical shell of the model 170 after printing the hollow physical shell based on the hollow digital shell of the printable 3D model 150'. The original exterior surface 151 of the preliminary digital 3D model 150 may be kept/retained for the printable 3D model 150', and may be cut/terminated at the top plane of the cylinder 151-C. The inner shell may also end/terminate at that plane, which plane may be selected by the user 110. The bottom edges of the inner shell may be treated as a curve, and may be copied and translated to become a hole that is visible from the bottom. The inner shell may be extended to meet this hole, which may be referred to herein as the opening 152 and/or the cavity 156.

Although the model 170 is referred to herein using the term "model," it is a physical 3D object/product that is printed by the 3D printer 160, and is not limited to replicas of larger physical objects 135. Rather, in some embodiments, the model 170 may be a physical product, such as a replacement part/component, that may be used in, or as, a machine or device.

Figure 2E:
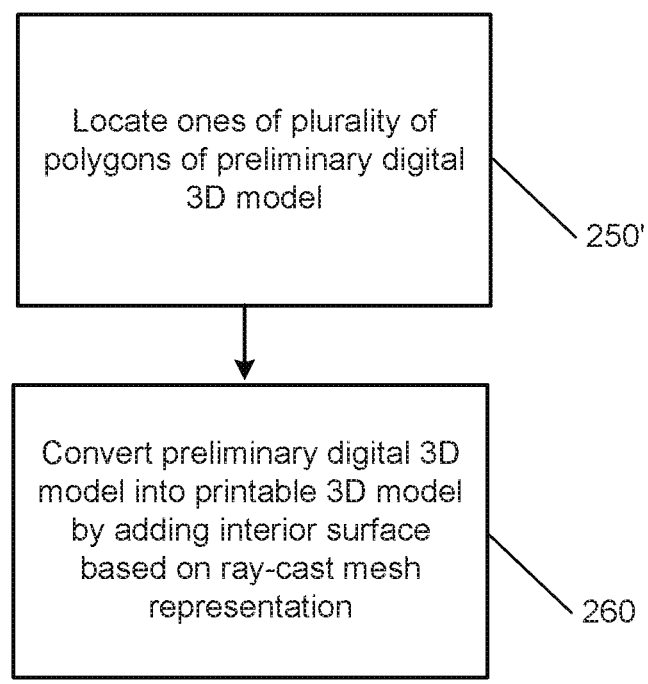

Referring now to FIG. 2E, operations in Block 250 of constructing the ray-cast mesh representation of the object 135 may include locating (Block 250') ones of a plurality of polygons 155 of an exterior surface 151 of the preliminary digital 3D model 150 that model features of the object 135. In some embodiments, the plurality of polygons 155 may include a plurality of triangles.

Figure 2F:
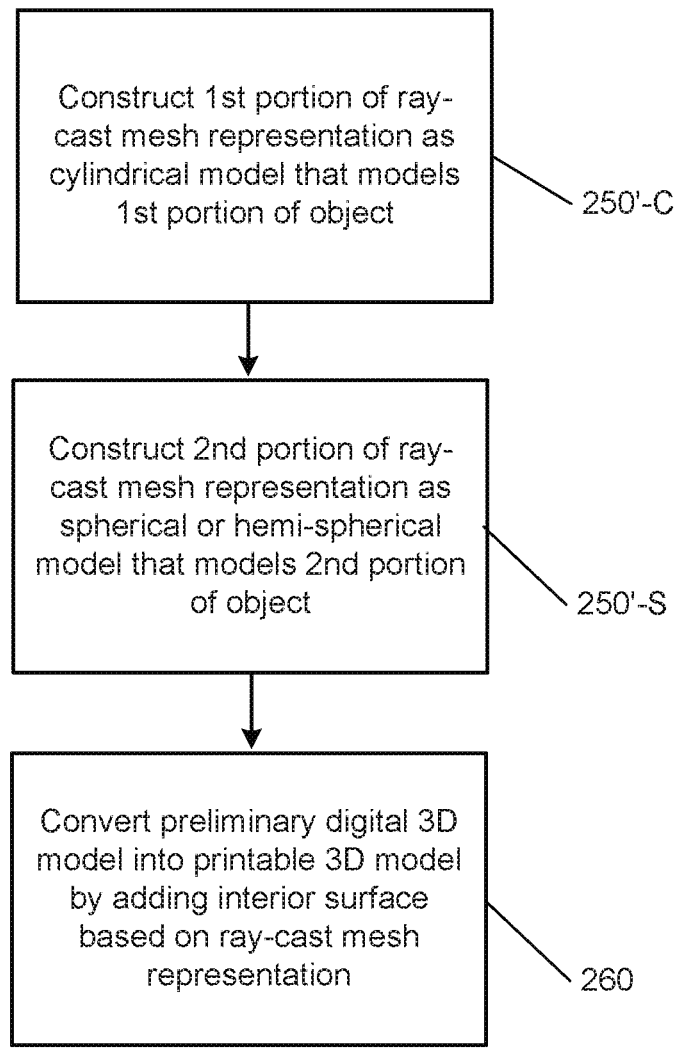

Additionally or alternatively, referring now to FIG. 2F, operations in Block 250 of constructing the ray-cast mesh representation of the object 135 may include constructing (Block 250'-C) a first portion of the ray-cast mesh representation by using cylindrical coordinates to model a first portion 135-C of the object 135. Moreover, the operations may include constructing (Block 250'-S) a second portion of the ray-cast mesh representation by using spherical coordinates to model a second portion (135-S) of the object (135). Accordingly, inner parts (e.g., different features of the interior surface 154) may be formed by ray-casting using discrete cylindrical/spherical coordinates. The resulting interior surface 154 is not necessarily formed as rough cylinder/sphere shape(s), but rather may be a close imprint/resemblance of the exterior surface 151 at material thickness away from the original mesh 150.

Figure 2G:
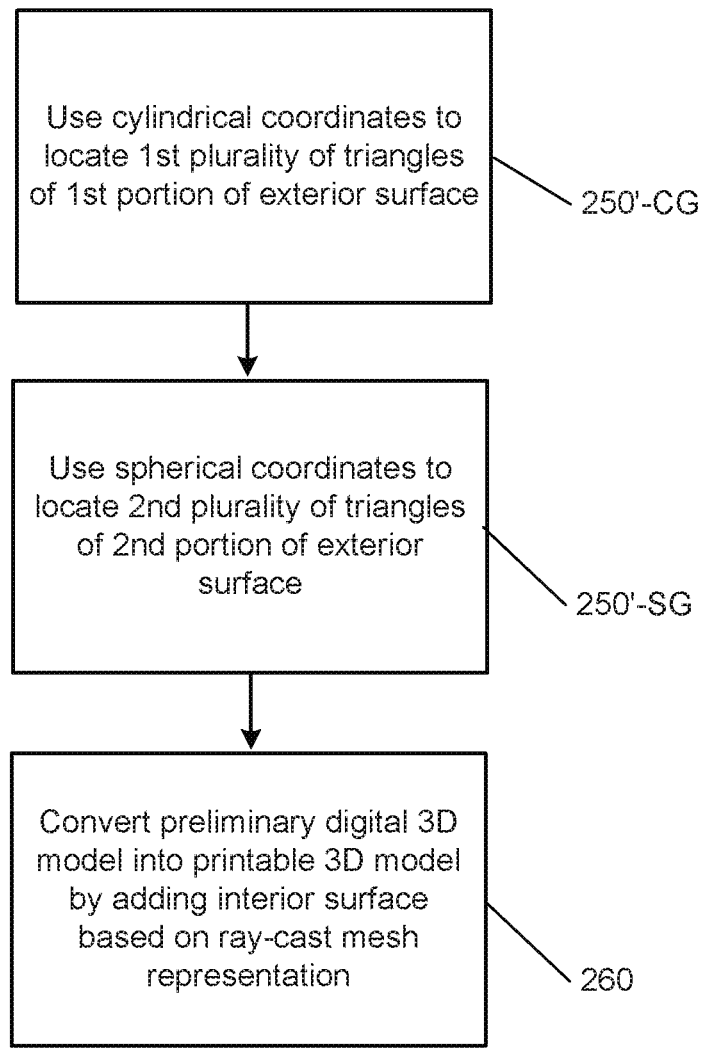

Referring now to FIG. 2G, operations in Block 250' of locating ones of the plurality of polygons 155 of the exterior surface 151 of the preliminary digital 3D model 150 may include using cylindrical coordinates to locate (Block 250'-CG) a first plurality of triangles 155 of a first portion 151-C of the exterior surface 151. Moreover, the operations may include using spherical coordinates to locate (Block 250'-SG) a second plurality of triangles 155 of a second portion 151-S of the exterior surface 151.

Figure 2H:
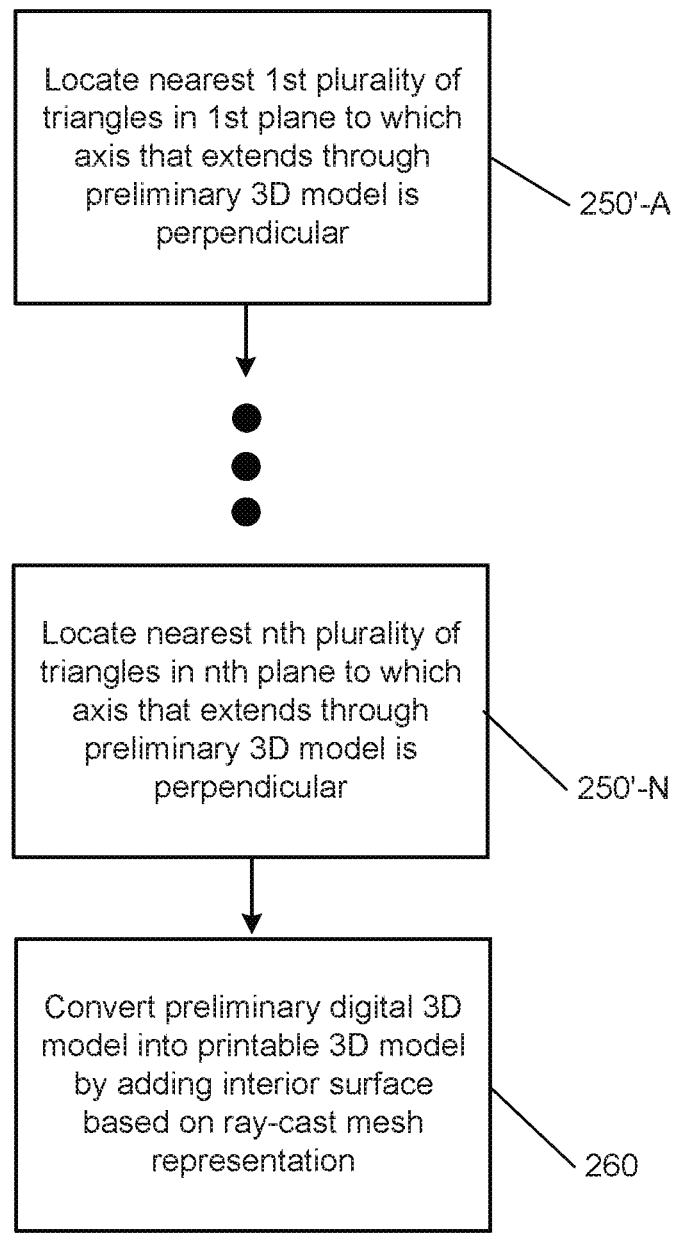

Additionally or alternatively, referring now to FIG. 2H, operations in Block 250' of locating ones of the plurality of polygons 155 of the exterior surface 151 of the preliminary digital 3D model 150 may include locating (Block 250'-A) a nearest first plurality of triangles 155 that are in a first plane to which an axis (e.g., the vertical axis in FIG. 1C) that extends through the preliminary digital 3D model 150 is perpendicular. Moreover, the operations may include locating (Block 250'-N) a nearest second plurality of triangles 155 that are in a second plane to which the same axis is perpendicular. As illustrated in FIG. 2H, the number of planes searched is referred to as "n," where n is an integer with a value of two (2) or higher. The planes that are generated for the searching may be at different vertical heights, respectively. Accordingly, operations herein may include locating nearest triangles 155 in a plurality of planes that are at a plurality of different vertical heights, respectively. The terms "closest" and "nearest" may be used interchangeably herein, and may refer to points/polygons 155 of the exterior surface 151 of the preliminary digital 3D model 150 relative to the vertical axis in FIG. 1C. Searching a plane may refer to casting a ray in the plane from the vertical axis to the exterior surface 151 of the preliminary digital 3D model 150 (i.e., casting the ray to points/polygons 155 of the exterior surface 151 that are in the plane).

Figure 2I:
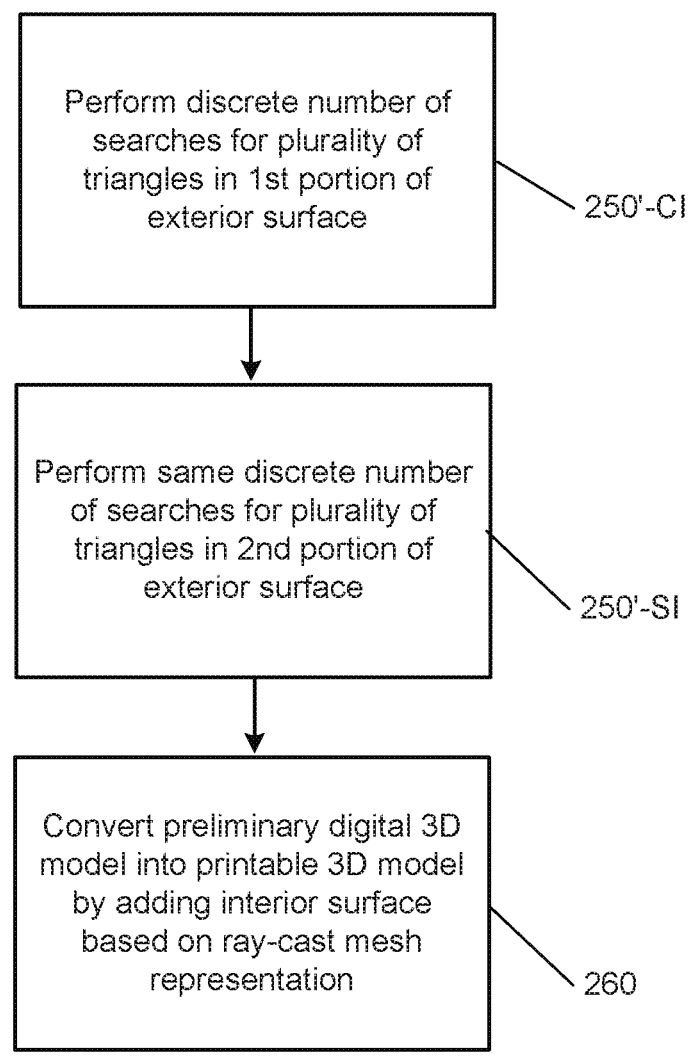

Additionally or alternatively, referring now to FIG. 2I, operations in Block 250' of locating ones of the plurality of polygons 155 of the exterior surface 151 of the preliminary digital 3D model 150 may include performing (Block 250'-CI) a discrete number of searches for a plurality of triangles 155 in a first portion 151-C of the exterior surface 151. Moreover, the operations may include performing (Block 250'-SI) the same discrete number of searches for the plurality of triangles 155 in a second portion 151-S of the exterior surface 151. The discrete number may be an integer with a value of one (1) or higher. Also, in some embodiments, the discrete number may be a predetermined number that is determined before beginning constructing (Block 250) the ray-cast mesh representation of the object 135. For example, the discrete number may be determined in response to identifying the object 135 as a person.

In some embodiments, performing (Block 250'-CI) the discrete number of searches for the plurality of triangles 155 in the first portion 151-C of the exterior surface 151 may include searching in a discrete number of directions to construct a first portion of the ray-cast mesh representation by using cylindrical coordinates. Moreover, performing (Block 250'-SI) the discrete number of searches for the plurality of triangles 155 in the second portion 151-S of the exterior surface 151 may include searching in the same discrete number of directions to construct a second portion of the ray-cast mesh representation by using spherical coordinates.

Figure 2J:
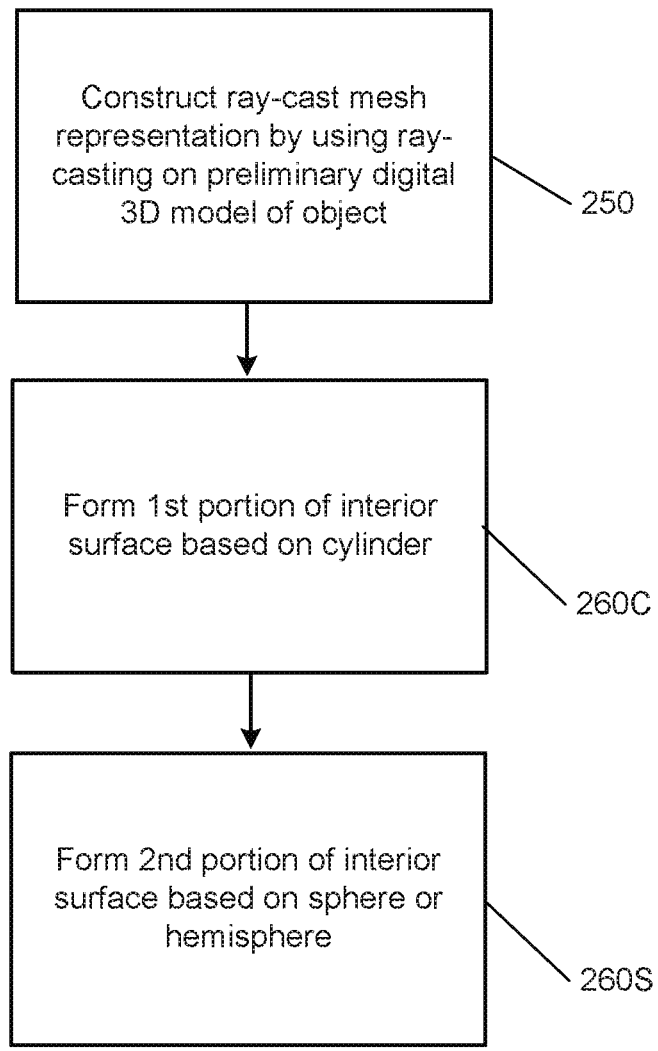

Referring now to FIG. 2J, operations in Block 260 of converting the preliminary digital 3D model 150 into the printable 3D model 150' may, in some embodiments, include forming (Block 260C) a first portion of the interior surface 154 based on a cylinder. Moreover, the operations may include forming (Block 260S) a second portion of the interior surface 154 based on a sphere or hemisphere. For example, ray-casting may be performed on the preliminary digital 3D model 150 to generate the interior surface 154 of the printable 3D model 150' as a combination of a cylinder and a sphere (or half-sphere).

Various ones of FIGS. 2F-2J recognize that when an object 135 is a person, the object 135 will have a first portion 135-S (e.g., a head) with a generally spherical or hemi-spherical shape and a lower second portion 135-C (e.g., neck/shoulders and/or lower portion of face) with a generally cylindrical shape. Various embodiments of present inventive concepts take advantage of these general shapes that are fairly consistent from person to person, and use them to simplify (e.g., via a reduced number of calculations/searches) formation of the interior surface 154 of the printable 3D model 150'. For example, the top half (including upper portions of the head) of the printable 3D model 150' may be generated using spherical coordinates, and the bottom half (including shoulders, neck, and/or lower portions of the head) of the printable 3D model 150' may be generated using cylindrical coordinates.

Accordingly, various embodiments of present inventive concepts may be optimized/customized for scanning a preliminary digital model 150 of a person's head because the rough shape of human heads is known to resemble a combination of cylindrical and spherical/hemi-spherical shapes. In particular, various embodiments of present inventive concepts may perform ray-casting to quickly generate a digital model 150', which is printable as a shelled/hollowed physical model 170, of human heads having these two shapes. Because it will result in a smaller amount of printed material, the digital model 150' is printed as a shelled/hollowed physical model 170 at a lighter weight than a solid physical model. It is therefore also less expensive to print than a solid model.

Although FIGS. 2C-2J individually illustrate various details that may be added to operations of Block 250 or Block 260 in FIGS. 2A and 2B, any detail added with respect to Block 250 may be combined with any detail added with respect to Block 260, and vice versa. For example, the added detail of the opening 152 in Block 260' of FIG. 2D may be formed in any of the FIGS. 2C-2J. Also, different ones of the details with respect to Block 250 are not intended to be mutually exclusive. Rather, they may be combined. For example, the added details of FIGS. 2E-2I may be combined with each other. Similarly, the added details in FIGS. 2C, 2D, and 2J with respect to Block 260 may be combined with each other. Moreover, although operations with respect to a cylindrical shape are sometimes illustrated in a flowchart as occurring before operations with respect to a spherical (or hemi-spherical) shape, the order of these operations may be reversed.

Referring now to FIG. 3A, a block diagram is provided of an electronic device 100 of FIG. 1A or FIG. 1E, according to various embodiments. The electronic device 100 may include a processor 350 and a storage medium 370. Moreover, the electronic device 100 may, in some embodiments, include an image capture device 340, a network interface 360, and/or a Graphical User Interface (GUI) 390. The GUI 390 may include a display and/or a keypad or other interface that receives inputs from a user 110. In some embodiments, the GUI 390 may include a touchscreen. The image capture device 340 may be any camera or other device that captures image data of the object 135 that can be used to construct a preliminary digital 3D model 150 of the object 135.

The processor 350 may be coupled to the network interface 360. The processor 350 may be configured to communicate with a device that provides image data (such as another electronic device 100) and/or with a 3D printer 160, via the network interface 360. For example, the network interface 360 may include one or more wireless interfaces (e.g., 3G/LTE, other cellular, WiFi, other short-range, etc.) and/or one or more physical wired interfaces (e.g., Ethernet, serial, USB interfaces, etc.).

Referring still to FIG. 3A, the storage medium 370 may be coupled to the processor 350. The storage medium 370 may also store instructions/algorithms used by the processor 350. For example, the storage medium 370 of the electronic device 100 may include one or more algorithms that modify a preliminary digital 3D model 150 and construct a printable 3D model 150'.

The electronic device 100 may, in some embodiments, include the GUI 390. For example, a user 110 may use the GUI 390 at the electronic device 100 to provide user input(s) (i) to capture, or otherwise obtain, image data with respect to the object 135, (ii) to construct a preliminary digital 3D model 150 of the object 135, (iii) to perform ray-casting on the preliminary digital 3D model 150, (iv) to construct a printable 3D model 150' based on a ray-cast mesh representation, and/or (v) to provide the printable 3D model 150' to a 3D printer 160.

Figure 3B:
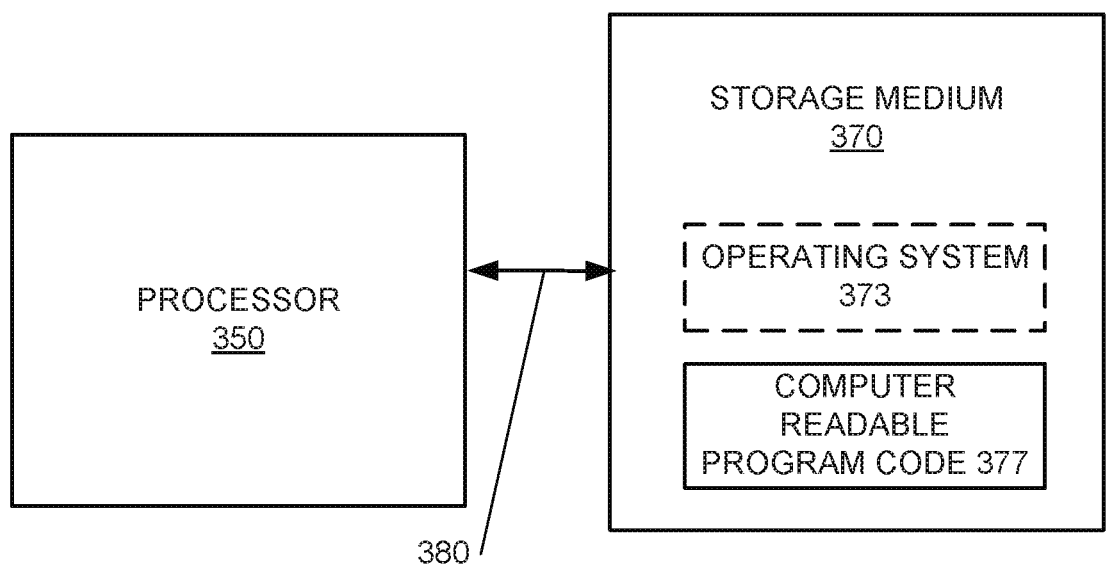
FIG. 3B is a block diagram that illustrates details of an example processor and memory that may be used in accordance with various embodiments.

Referring now to FIG. 3B, a block diagram is provided that illustrates details of an example processor 350 and storage medium 370 of an electronic device 100 that may be used in accordance with various embodiments. The processor 350 communicates with the storage medium 370 via an address/data bus 380. The processor 350 may be, for example, a commercially available or custom microprocessor. Moreover, the processor 350 may include multiple processors. The storage medium 370 may be referred to herein as a "memory" and may be representative of the overall hierarchy of memory devices containing the software and data used to implement various functions of an electronic device 100 as described herein. The storage medium 370 may include, but is not limited to, the following types of devices: cache, ROM, PROM, EPROM, EEPROM, flash, Static RAM (SRAM), and Dynamic RAM (DRAM).

As shown in FIG. 3B, the storage medium 370 may hold various categories of software and data, such as computer readable program code 377 and/or an operating system 373. The operating system 373 controls operations of an electronic device 100. In particular, the operating system 373 may manage the resources of an electronic device 100 and may coordinate execution of various programs by the processor 350. The computer readable program code 377, when executed by the processor 350, may cause the processor 350 to perform any of the operations illustrated in the flowcharts of FIGS. 2A-2J.

Some computer-aided design packages have included generic (e.g., not optimized/customized for models of a human head) shelling techniques. Such generic shelling techniques, however, can be theoretically complex and heavy on computations. Although the generic shelling techniques can be designed to work with simple 3D meshes, they may be unlikely to work on scans/images that have inverted parts.

Various embodiments herein provide improved methods for generating printable 3D models 150'. Specifically, by using ray-casting on a preliminary digital 3D model 150, which is printable as a solid physical 3D model/object, to convert the preliminary digital 3D model 150 into a printable 3D model 150' that is printable as a hollow physical 3D model/object 170, operations described herein may quickly generate the printable 3D model 150'. Also, because the printable 3D model 150' is printable as a hollow physical object, it can be printed as a lighter-weight model 170 at a reduced printing cost. Moreover, when an object 135 being modeled is a person, operations described herein may further expedite the modeling process by using a combination of cylindrical and spherical (or hemi-spherical) shapes that represent at least portions of a human neck and head, respectively. Although operations herein have been described in the context of modeling a human head, these operations may be applied to modeling other objects, including models of animals, automobiles, and various other objects.

Various embodiments herein recognize, and exploit, the fact that 3D printing a perfect shell with an inside that follows all wrinkles and details of a preliminary digital 3D model 150 surface may not be required. Instead, various embodiments herein may insert a "pole" that covers half of the preliminary digital 3D model 150 height. Along the length of the pole, nearest (e.g., nearest to the pole/vertical axis in FIG. 1C) points may be found on the preliminary digital 3D model 150's mesh representation, using a discrete set of cylindrical coordinates (with the pole as the r=0 axis). This may cover the bottom half of the model, and the top half may be handled by finding nearest points in spherical coordinates extending from the tip of the pole. The term "tip," as used herein, may refer to a point, on the vertical axis (FIG. 1C), that divides the sphere (or half-sphere) and the cylinder. For example, the tip may be at or near a mesh representation of a nose when the object 135 is a person. From the set of nearest points, an inside mesh (e.g., the interior surface 154) is created that covers the interior using a specified distance from the outer shell (e.g., the exterior surface 151).

Because the algorithm/operations herein may refrain from using any neighbor (e.g., neighboring triangle 155) information about topology, the algorithm/operations may be immune to topological problems/complexities in the preliminary digital 3D model 150. Time complexity may be linear with respect to the number of points in the preliminary digital 3D model 150, and the algorithm/operations herein may thus avoid long computation times for preliminary digital 3D models 150 with many facets. As an example, for a preliminary digital 3D model 150 with thirty-thousand (30,000) triangles, a conventional approach could take many minutes to generate a digital shell instead of the fragments of a second that the algorithm/operations herein may use to provide a printable digital 3D shell/model 150' that is printable as a hollow physical 3D object.

Specific example embodiments of present inventive concepts are described with reference to the accompanying drawings. Present inventive concepts may, however, be embodied in a variety of different forms and should not be construed as limited to the embodiments set forth herein. Rather, these embodiments are provided so that this disclosure will be thorough and complete and will fully convey the scope of present inventive concepts to those skilled in the art. In the drawings, like designations refer to like elements. It will be understood that when an element is referred to as being "connected," "coupled," or "responsive" to another element, it can be directly connected, coupled or responsive to the other element or intervening elements may be present. Furthermore, "connected," "coupled," or "responsive" as used herein may include wirelessly connected, coupled, or responsive.

The terminology used herein is for the purpose of describing particular embodiments only and is not intended to be limiting of present inventive concepts. As used herein, the singular forms "a," "an," and "the" are intended to include the plural forms as well, unless expressly stated otherwise. It will be further understood that the terms "includes," "comprises," "including," and/or "comprising," when used in this specification, specify the presence of stated features, steps, operations, elements, and/or components, but do not preclude the presence or addition of one or more other features, steps, operations, elements, components, and/or groups thereof. As used herein, the term "and/or" includes any and all combinations of one or more of the associated listed items. The symbol "/" is also used as a shorthand notation for "and/or."

Unless otherwise defined, all terms (including technical and scientific terms) used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and the present disclosure, and will not be interpreted in an idealized or overly formal sense unless expressly so defined herein.

It will also be understood that although the terms "first" and "second" may be used herein to describe various elements, these elements should not be limited by these terms. These terms are only used to distinguish one element from another element. Thus, a first element could be termed a second element, and similarly, a second element may be termed a first element without departing from the teachings of present inventive concepts.

Example embodiments of present inventive concepts may be embodied as nodes, devices, apparatuses, and methods. Accordingly, example embodiments of present inventive concepts may be embodied in hardware and/or in software (including firmware, resident software, micro-code, etc.). Furthermore, example embodiments of present inventive concepts may take the form of a computer program product comprising a non-transitory computer-usable or computer-readable storage medium having computer-usable or computer-readable program code embodied in the medium for use by or in connection with an instruction execution system. In the context of this document, a computer-usable or computer-readable medium may be any medium that can contain, store, communicate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, or device. More specific examples (a nonexhaustive list) of the computer-readable medium would include the following: an electrical connection having one or more wires, a portable computer diskette, a random access memory (RAM), a read-only memory (ROM), an erasable programmable read-only memory (EPROM or Flash memory), an optical fiber, and a portable compact disc read-only memory (CD-ROM). Note that the computer-usable or computer-readable medium could even be paper or another suitable medium upon which the program is printed, as the program can be electronically captured, via, for instance, optical scanning of the paper or other medium, then compiled, interpreted, or otherwise processed in a suitable manner, if necessary, and then stored in a computer memory.

Example embodiments of present inventive concepts are described herein with reference to flowchart and/or block diagram illustrations. It will be understood that each block of the flowchart and/or block diagram illustrations, and combinations of blocks in the flowchart and/or block diagram illustrations, may be implemented by computer program instructions and/or hardware operations. These computer program instructions may be provided to a processor of a general purpose computer, a special purpose computer, or other programmable data processing apparatus to produce a machine, such that the instructions, which execute via the processor of the computer or other programmable data processing apparatus, create/use circuits for implementing the functions specified in the flowchart and/or block diagram block or blocks.

These computer program instructions may also be stored in a computer usable or computer-readable memory that may direct a computer or other programmable data processing apparatus to function in a particular manner, such that the instructions stored in the computer usable or computer-readable memory produce an article of manufacture including instructions that implement the functions specified in the flowchart and/or block diagram block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart and/or block diagram block or blocks.

In the specification, various embodiments of present inventive concepts have been disclosed and, although specific terms are employed, they are used in a generic and descriptive sense only and not for purposes of limitation. Those skilled in the art will readily appreciate that many modifications are possible for the disclosed embodiments without materially departing from the teachings and advantages of present inventive concepts. The present inventive concepts are defined by the following claims, with equivalents of the claims to be included therein.

What is claimed is:

1. A method of constructing a printable three-dimensional (3D) model, the method comprising:
constructing a ray-cast mesh representation of an object by using ray-casting on a preliminary digital 3D model of the object; and
converting the preliminary digital 3D model of the object into the printable 3D model of the object by adding, to the preliminary digital 3D model of the object, an interior surface that is based on the ray-cast mesh representation,
wherein the using ray-casting on the preliminary digital 3D model comprises:
constructing a first portion of the ray-cast mesh representation by using cylindrical coordinates to model a first portion of the object; and
constructing a second portion of the ray-cast mesh representation by using spherical coordinates to model a second portion of the object.

2. The method of claim 1,
wherein the preliminary digital 3D model comprises a first 3D mesh representation of the object that is printable as a solid physical 3D model,
wherein the printable 3D model comprises a second 3D mesh representation of the object that is printable as a hollow physical 3D model, and
wherein the converting comprises using the ray-cast mesh representation to convert the first 3D mesh representation into the second 3D mesh representation.

3. The method of claim 1,
wherein the preliminary digital 3D model comprises a plurality of polygons of an exterior surface of the preliminary digital 3D model that model features of the object, and
wherein the using ray-casting on the preliminary digital 3D model comprises locating ones of the plurality of polygons of the exterior surface.

4. The method of claim 3, wherein the locating the ones of the plurality of polygons of the exterior surface comprises:
using cylindrical coordinates to locate a first plurality of triangles of a first portion of the exterior surface; and
using spherical coordinates to locate a second plurality of triangles of a second portion of the exterior surface.

5. The method of claim 3, wherein the locating the ones of the plurality of polygons of the exterior surface comprises:
locating a nearest first plurality of triangles that are in a first plane to which an axis that extends through the preliminary digital 3D model is perpendicular; and
locating a nearest second plurality of triangles that are in a second plane to which the axis is perpendicular.

6. The method of claim 3, wherein the locating the ones of the plurality of polygons of the exterior surface comprises:
performing a discrete number of searches for a plurality of triangles in a first portion of the exterior surface; and
performing the discrete number of searches for the plurality of triangles in a second portion of the exterior surface.

7. The method of claim 6,
wherein the performing the discrete number of searches for the plurality of triangles in the first portion of the exterior surface comprises searching in a discrete number of directions to construct the first portion of the ray-cast mesh representation by using cylindrical coordinates, and
wherein the performing the discrete number of searches for the plurality of triangles in the second portion of the exterior surface comprises searching in the discrete number of directions to construct the second portion of the ray-cast mesh representation by using spherical coordinates.

8. The method of claim 1, wherein the converting comprises shaping the interior surface to construct the printable 3D model as a hollow digital shell comprising an opening that exposes the interior surface.

9. The method of claim 1, wherein the converting comprises:
forming a first portion of the interior surface based on a cylinder; and
forming a second portion of the interior surface based on a sphere or hemisphere.

10. The method of claim 1, further comprising providing the printable 3D model, from a portable electronic device that performs the ray-casting on the preliminary digital 3D model, to a 3D printer.

11. The method of claim 1, wherein the converting comprises forming the interior surface at a predetermined distance from an exterior surface of the preliminary digital 3D model.

12. The method of claim 1, further comprising:
receiving, in a storage medium, image data for the object from an image capture device; and
constructing the preliminary digital 3D model based on the image data.

13. The method of claim 1, wherein an exterior surface of the preliminary digital 3D model comprises a higher level of topological detail of a surface of the object than the interior surface.

14. An electronic device comprising:
a processor; and
a storage medium coupled to the processor and comprising computer readable program code therein that when executed by the processor causes the processor to perform the method of claim 1.

15. A computer program product comprising:
a non-transitory computer readable storage medium comprising computer readable program code therein that when executed by a processor causes the processor to perform the method of claim 1.

16. A computer program product comprising:
a non-transitory computer readable storage medium comprising computer readable program code therein that when executed by a processor causes the processor to perform operations comprising:
constructing a ray-cast mesh representation of an object by using ray-casting on a preliminary digital 3D model of the object;
converting the preliminary digital 3D model of the object into a printable 3D model of the object by adding, to the preliminary digital 3D model of the object, an interior surface that is based on the ray-cast mesh representation; and
providing the printable 3D model to a 3D printer,
wherein the using ray-casting on the preliminary digital 3D model comprises:
constructing a first portion of the ray-cast mesh representation by using cylindrical coordinates to model a first portion of the object; and
constructing a second portion of the ray-cast mesh representation by using spherical coordinates to model a second portion of the object.

17. The computer program product of claim 16,
wherein the preliminary digital 3D model comprises a plurality of triangles of an exterior surface of the preliminary digital 3D model that model features of the object, and
wherein the computer readable program code comprises computer readable program code configured to perform the ray-casting on the preliminary digital 3D model by:
using cylindrical coordinates to locate first ones of the plurality of triangles of a first portion of the exterior surface; and
using spherical coordinates to locate second ones of the plurality of triangles of a second portion of the exterior surface.

18. An electronic device comprising:
a processor; and
a storage medium coupled to the processor and comprising computer readable program code that when executed by the processor causes the processor to perform operations comprising:
constructing a ray-cast mesh representation of an object by using ray-casting on a preliminary digital 3D model of the object; and
converting the preliminary digital 3D model of the object into a printable 3D model of the object by adding, to the preliminary digital 3D model of the object, an interior surface that is based on the ray-cast mesh representation,
wherein the electronic device is a portable electronic device comprising the storage medium, the processor, and an image capture device that is configured to capture image data of the object,
wherein the portable electronic device comprises a smartphone, a tablet computer, a laptop computer, or a portable camera,
wherein the preliminary digital 3D model comprises a plurality of triangles of an exterior surface of the preliminary digital 3D model that model features of the object based on the image data, and
wherein the processor is configured to perform the ray-casting on the preliminary digital 3D model by:
using cylindrical coordinates to locate first ones of the plurality of triangles of a first portion of the exterior surface; and
using spherical coordinates to locate second ones of the plurality of triangles of a second portion of the exterior surface.

19. The electronic device of claim 18,
wherein the processor is configured to perform the converting by shaping the interior surface to construct the printable 3D model as a hollow digital shell comprising an opening that exposes the interior surface, and
wherein the processor is further configured to provide the hollow digital shell from the portable electronic device to a 3D printer.

* * * * *